I. HALL.
TEMPERATURE REGULATOR.
APPLICATION FILED OCT. 19, 1914.

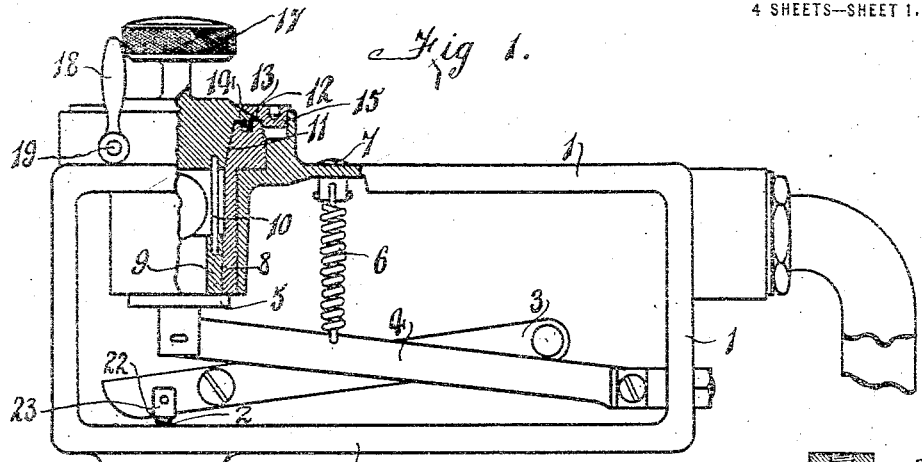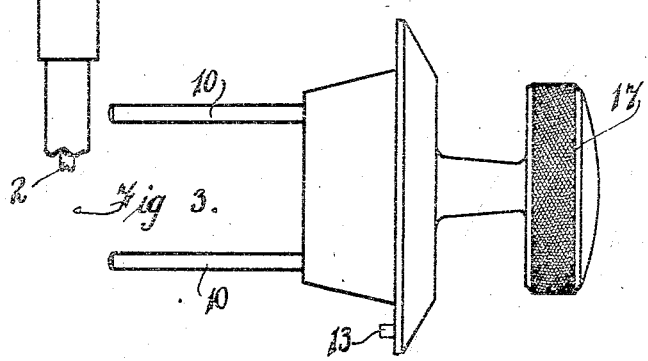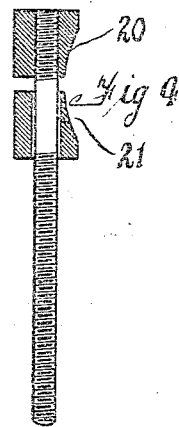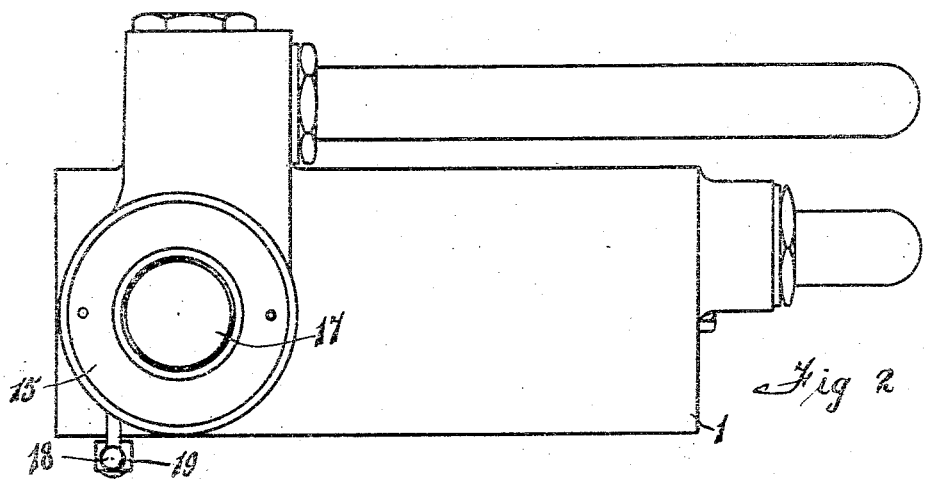

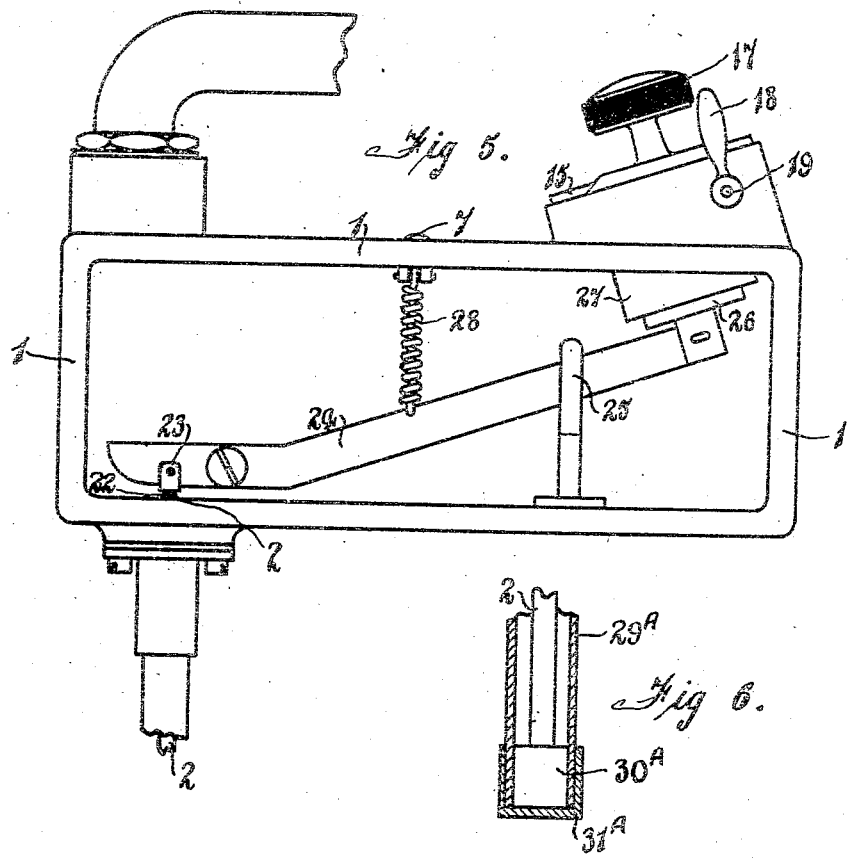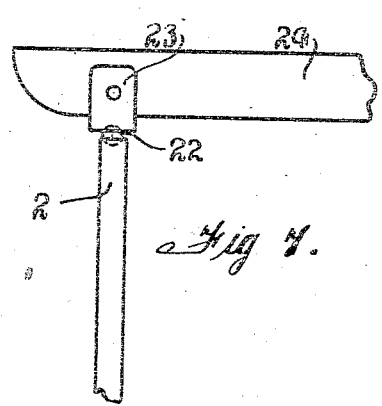

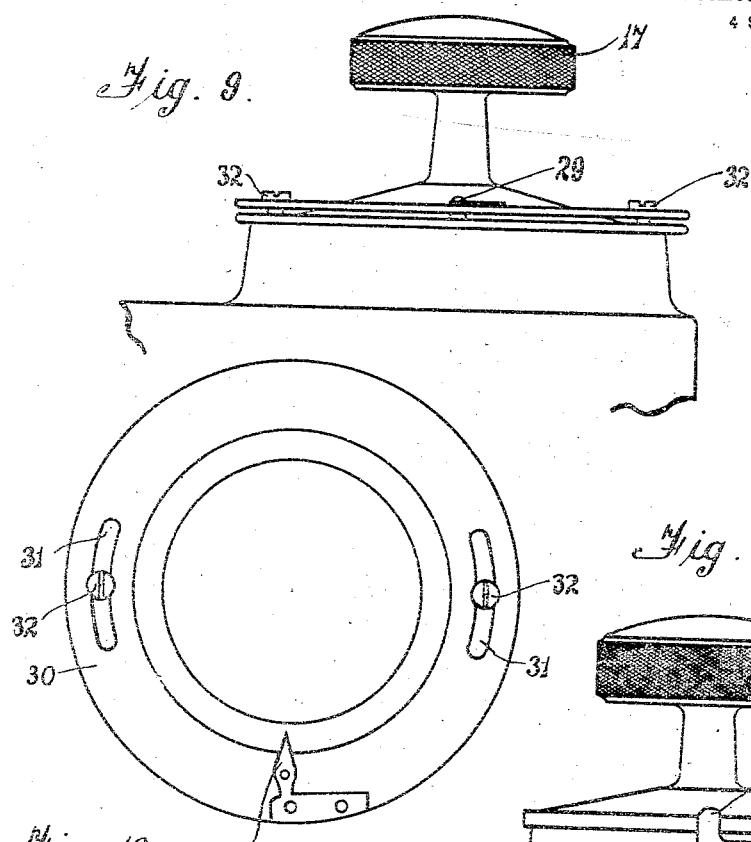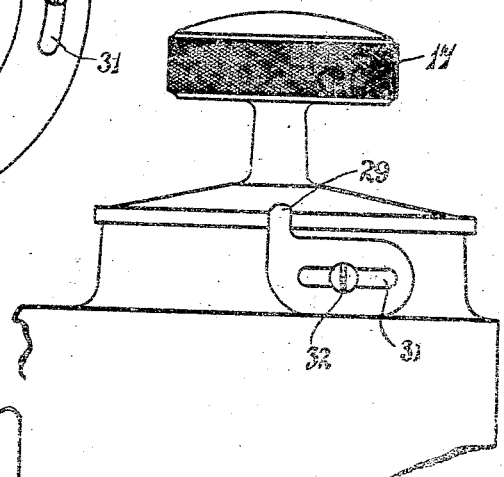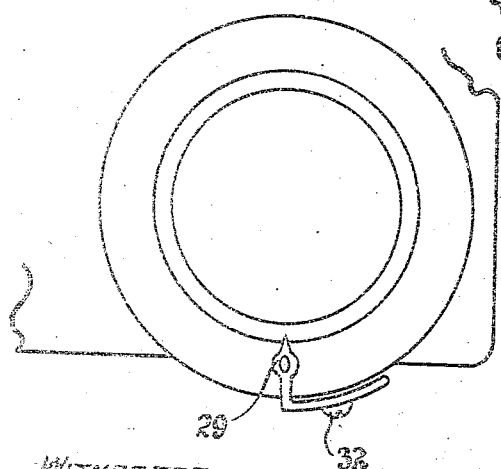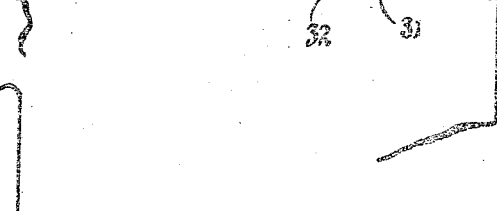

1,149,046.

Patented Aug. 3, 1915.
4 SHEETS—SHEET 4.

UNITED STATES PATENT OFFICE.

ISAIAH HALL, OF ASTON, BIRMINGHAM, ENGLAND.

TEMPERATURE-REGULATOR.

1,149,046.

Specification of Letters Patent.

Patented Aug. 3, 1915.

Application filed October 19, 1914. Serial No. 867,454.

*To all whom it may concern:*

Be it known that I, ISAIAH HALL, subject of the King of Great Britain, residing at Whitehouse street, Aston, Birmingham, in the county of Warwick, England, have invented a new and useful Improvement in Temperature-Regulators; and I do hereby declare the following to be a full, clear, and exact description of the same.

This invention relates to apparatus for regulating and controlling temperatures of a similar kind to that set forth in my U. S. A. application Serial No. 790046 filed the 16th September, 1913, and has for its object to provide improved apparatus for this purpose, more especially for use with metal melting furnaces particularly those for re-melting used type. Apparatus made in accordance with my said prior invention comprises a casing through which gas passes on its way to a heating burner, and containing a valve controlling the admission of gas, said valve being operated by a thermostat or differential expansion device. I described also in my said prior specification an adjustable valve seating, and my present invention comprises improvements on such seating and on other parts of the apparatus and the arrangement thereof.

According to my present invention I provide apparatus for regulating and controlling temperatures of the kind set forth having a valve seating with a thread upon its outer periphery engaging a thread in the seating support in combination with a knob head or like upon the exterior of the casing and secured against axial movement and means for transmitting rotary movement from the knob or like to the valve seating while permitting to the latter an independent axial movement. This arrangement has the advantage that leakage past the seating is much less likely when it is screw threaded on the outside than when it is merely a sliding fit.

Various other improvements will also be made clear from the description and claiming clauses herein contained.

Figure 13:
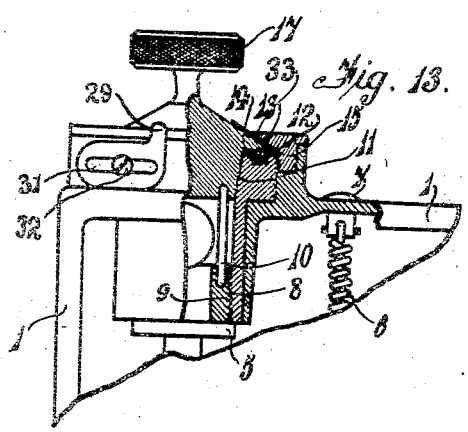
Figure 14:
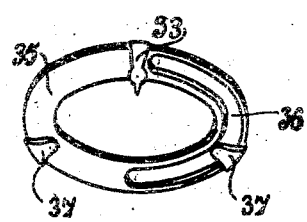
Figure 15:
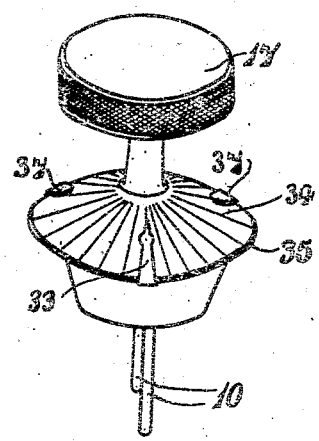
Figure 16:
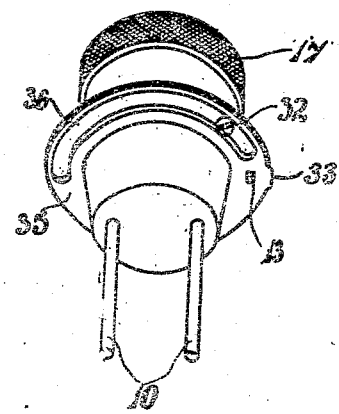

Referring to the drawings: Figure 1. is an elevation, partly in section, showing a form of my improved device with the cover removed from the casing. Fig. 2. is a plan of the same. Fig. 3. is an elevation of the adjusting head. Fig. 4. shows the locking arrangement, and Fig. 5. shows an alternative form of the invention wherein a single lever and an inclined seating are employed. Figs. 6, 7 and 8. being views of details. Figs. 9 and 11 are elevations showing alternative forms of adjustable pointer, Figs. 10 and 12 being corresponding plans. Fig. 13. is a part sectional elevation showing an adjustable combined stop and zero indicator. Figs. 14, 15 and 16. being perspective views of details.

In carrying my invention into practice as illustrated upon the accompanying drawings I provide a casing 1 wherein projects a rod 2 actuated by a thermostat (which may be similar to that described in my U. S. A. application Serial No. 790046 filed the 16th September, 1913,) the said rod being adapted as it rises to raise the short end of a pivoted lever 3 the far end of which operates near the pivot of a second lever 4, pivoted at the far end of the casing and carrying the gas valve 5, to depress the same against the action of a spring 6 carried by a screw 7 in the top of the casing. It will be clear that the temperature at which the valve will close completely, as also the extent to which the valve will be open at any given temperature may be adjusted by raising or lowering the valve seating. According to this form of my invention the seating support is internally screw-threaded at 8 to receive the seating 9 which may be rotated by means of two or more pins 10 adapted to fit in holes near its upper periphery and carried by a rotatable head or vice versa or by other means for transmitting rotary movement from the knob or like to the valve seating while permitting to the latter an independent axial movement. By the use of such pins I avoid the necessity for a bridge-piece or like across the top of the seating as described in my aforesaid prior specification. The rotatable head may fit in a conical seating 11 formed on the upper part of the seating support and may also have a horizontal annular portion 12 adapted to lie upon the upper surface of the same. A pin 13 or projecting point upon either the seating support or the head may revolve within a slot 14 or depression formed in the other, a stop being disposed at one point in the slot so that one complete revolution is permitted to the head without disengagement of the same from the seating support in order to lift the pin or projecting point over the stop in the slot. Normally such disengagement is prevented by means of a retaining ring 15 which is screwed down against the upper part of the seating support which projects beyond the casing.

The pitch of the thread on the seating is in a preferred form of the invention so regulated in relation to the area of the valve and other factors that one complete revolution of the head (which is provided with a knob 17 with milled edges or the like upon its upper surface) is equivalent to an adjustment through the complete range of temperatures desired for the particular material or process in question. For instance for re-melting type metal the range may conveniently extend over 175°. I may also provide a locking device comprising a handle 18 on a spindle 19 by means of which a pair of suitably curved members 20, 21 may be drawn together to lock against the face of the conical portion of the head.

According to a modification each revolution of the head is equivalent to a sub-multiple of the total range of temperature desired, say to 10° or 20°, and the stop or like may be raised to pass the fixed stop in passing from one such range of 10° to 20° to another. Clearly such an arrangement makes it particularly important that the opening of the valve shall vary as nearly as possible in direct proportion to the difference of temperature throughout the full range, although this is in any case important in order to keep the graduations showing the temperature equally spaced. Now in cases where the contact between the thermostat and lever is by means of a square end or the like it is clear that as the differential expansion takes effect the angle of the pivoted lever is changing and the effective point of engagement also changes, for the engagement will be between the one edge of the inner differential expansion member and the lever after the lever has moved from its position at right angles to the differential expansion member, the effect of this being to change the leverage by reducing the distance between the point of effective engagement and the pivot point, with the result that the movement of the valve or indicator will not be directly proportional to the movement of the differential expansion controlling device. In order to overcome this defect the rod 2 has its extremity recessed to receive a small steel ball 22 which abuts either directly against the lever or against a recess formed on the underside of a yoke piece 23, pivotly secured to the said lever, the contact being between the highest point of the ball and the underside of the lever or yoke piece, no matter what the angle of inclination of the lever is, or I may use an equivalent arrangement. This arrangement is applicable to the devices described in my U. S. A. application Serial No. 790046 filed the 16th September 1913, and my British specifications Nos. 26583 A. D. 1913, 28126 A. D. 1913, 28346 A. D. 1913 and 5198 A. D. 1914. Although I have described this form of my invention in some detail I do not wish to exclude equivalents from the scope of my invention. For instance in some cases I may employ a single longer lever in place of the two described, and various forms of head and locking device may be used.

As shown at Fig. 5 a single lever 24 is pivoted at 25 and has one end resting upon the rod 2 through the medium of the steel ball 22. The farther end of the lever is attached to and carries a valve 26 which is adapted to be moved from or toward its seating 27 thereby. In order to obtain the greatest possible movement of the valve I prefer to arrange this seating in a corner of the chamber opposite to that in which the differential device is disposed; the lever or rod may be parallel to the bottom of the chamber until after the pivotal point when it must be bent so as to bring the valve to the correct position with regard to the seating which is inclined so that the motion of the valve about the pivot withdraws the same in a direction substantially at right angles to the seating. A spring 28 is disposed to tend to hold the valve upon its seat as in my aforesaid prior specification.

In order to actuate an indicating device such as is shown in my U. S. A. application Serial No. 790046, filed the 16th, September 1913, in case such is to be employed I may provide either a separate branch upon the lever or the indicating device might be actuated from an intermediate point or from an extension upon the same. Some method of graduating the head or the top of the chamber to show the temperature to which the device is set may be provided such as a fixed pointer 29 or mark upon the casing and a graduated scale marked around the upper surface of the head, or a pointer might be carried by the head to read upon a fixed scale.

I have found that in using a thermostatic device as described herein or in my U. S. A. application Serial No. 790046 filed the 16th, September 1913, in a molten type metal bath it is difficult to plug the bottom of the depending tube 29$^A$ in such a way that none of the metal will get past the plug. A solid ended tube is expensive and difficult to drill out if it is of any considerable length and accordingly I prefer to use a cylindrical plug of steel 30$^A$ which is driven into the lower end of the tube and electrically welded, and a cap 31$^A$ or like is then placed over the outside of the bottom of the tube and also electrically welded. I have also found that for the inner member of the thermostat electrified graphite forms a suitable material.

It will be clear that either in the present apparatus or that according to my U. S. A. application Serial No. 790046 filed the 16th, September 1913, the inner member comprises a certain length of practically non-expansible carbon or like and an intermediate rod 2, preferably of iron or steel. The length upon which the differential expansion is effective is thus the length of the carbon stick or like, and by altering the length of the same and correspondingly altering the length of the intermediate rod I am enabled to obtain an effective adjustment of the nature of the regulation effected by the device without necessarily altering the length of the outer tube.

In order to obtain a correct adjustment of the pointer 29 relatively to the scale we may mount it upon a sheet metal base 30 provided with a slot or slots 31, a screw 32 being adapted to secure it to the casing. Moreover we may make the stop or pin 13 adjustable together with a "zero-mark" or pointer 33 which may be so adjusted as to give a required temperature as that at which a range of temperatures is to be entered, and thus the same instrument may be adapted to enter upon its range at various temperatures, the markings 34 not being definitely fixed for any particular temperature, but each, reading to the left of the "zero-mark" denoting (say) 5° above the temperature at which the range is set to be entered. It will be seen that the pin 13 and "zero-mark" 33 are both carried upon the base plate 35 and are adjustable within the limits of the slot 36. Metal tongues 37 are provided, so that the retaining ring 15 bears against these tongues, as well as the "zero-mark" 33 and keeps the head evenly upon its seat. This device may be employed apart from or in conjunction with the adjustable pointer 29.

What I claim then is:—

1. In apparatus for regulating and controlling temperatures the combination of a casing through which gas is adapted to pass; a valve; a thermostat adapted to operate said valve; a valve seating having a screw thread upon its outer periphery; a seating support wherein the valve seating is screwed; a head upon the exterior of the casing secured against axial movement; and means for transmitting rotary movement from the said head to the said valve seating while permitting to the latter an independent axial movement.

2. In apparatus for regulating and controlling temperatures the combination of a casing through which gas is adapted to pass; a valve; a thermostat adapted to operate said valve; a valve seating; a head upon the exterior of the casing adapted to adjust said valve seating; and means for limiting the rotation of the head to a single revolution and to correspond to a predetermined range of temperature.

3. In apparatus for regulating and controlling temperatures the combination of a casing through which gas is adapted to pass; a valve; a thermostat adapted to operate said valve; a valve seating having a screwthread upon its outer periphery; a seating support wherein the valve seating is screwed; a head upon the exterior of the casing secured against axial movement; and means for transmitting rotary movement from the said head to the said valve seating while permitting to the latter an independent axial movement; and the various parts being proportioned relatively to the pitch of the thread upon the valve seating that a single revolution of the head corresponds to a predetermined range of temperature.

4. In apparatus for regulating and controlling temperatures the combination of a casing through which gas is adapted to pass; a valve; multiplying mechanism carrying said valve; a thermostat depending from said casing and comprising an outer tube and an inner rod; a steel ball intermediate said inner rod and said multiplying mechanism; a valve seating having a screwthread upon its outer periphery; a seating support wherein the valve seating is screwed; a head upon the exterior of the casing secured against axial movement; and means for transmitting rotary movement from the said head to the said valve seating while permitting to the latter an independent axial movement.

5. In apparatus for regulating and controlling temperatures the combination of a casing through which gas is adapted to pass; a valve; a thermostat adapted to operate said valve; a valve seating having a screwthread upon its outer periphery; a seating support wherein the valve seating is screwed; a head upon the exterior of the casing secured against axial movement; means for transmitting rotary movement from the said head to the said valve seating while permitting to the latter an independent axial movement; a stop for normally limiting the rotation of the head to a single revolution corresponding to a definite range of temperature.

6. In apparatus for regulating and controlling temperatures the combination of a casing through which gas is adapted to pass; a valve; a thermostat adapted to operate said valve; a valve seating having a screwthread upon its outer periphery; a seating support wherein the valve seating is screwed; a head upon the exterior of the casing secured against the axial movement;

and a plurality of pins slidably engaging holes near the upper periphery of said seating and carried by said head.

7. In apparatus for regulating and controlling temperatures the combination of a casing through which gas is adapted to pass; a valve; a lever pivoted within said casing, having its longer end bent upwardly and carrying said valve; a thermostat adapted to operate said lever; a valve seating having a screw-thread upon its outer periphery; an inclined valve seating; an inclined seating support wherein the valve seating is screwed; a head upon the exterior of the casing secured against axial movement; and means for transmitting rotary movement from the said head to the said valve seating while permitting to the latter an independent axial movement.

8. In apparatus for regulating and controlling temperatures the combination of a casing through which gas is adapted to pass; a valve; a thermostat adapted to operate said valve; a valve seating having a screw thread upon its outer periphery; a seating support wherein the valve seating is screwed; a head upon the exterior of the casing secured against axial movement, means for transmitting rotary movement from the said head to the said valve seating while permitting to the latter an independent axial movement; a pointer upon the casing adapted to register against said head; a slotted base carrying said pointer; and a screw adapted to secure said base to the casing.

9. In apparatus for regulating and controlling temperatures the combination of a casing through which gas is adapted to pass; a valve; a differential expansion device adapted to operate said valve; a valve seating; a head upon the exterior of the casing adapted by its rotation to raise or lower said seating; a pointer upon the casing adapted to register against said head; an adjustable plate adapted to be fixed to said head; a "zero-mark" carried by said plate; and a pin carried by said plate opposite to said "zero-mark."

10. In apparatus for regulating and controlling temperatures the combination of a casing through which gas is adapted to pass; a valve; a differential expansion device adapted to operate said valve; a valve seating; a head upon the exterior of the casing adapted by its rotation to raise or lower said seating; a pointer upon the casing adapted to register against said head; a slotted base carrying said pointer; a screw adapted to secure said base to the casing; an adjustable plate adapted to be fixed to said head; a "zero-mark" carried by said plate; and a pin carried by said plate opposite to said "zero-mark."

11. In apparatus for regulating and controlling temperatures the combination of a casing through which gas is adapted to pass; a valve; a thermostat adapted to operate said valve; a valve seating having a screw thread upon its outer periphery; a seating support wherein the valve seating is screwed; a head upon the exterior of the casing secured against axial movement; means for transmitting rotary movement from the said head to the said valve seating while permitting to the latter an independent axial movement; a pointer upon the casing adapted to register against said head; a slotted base carrying said pointer; a screw adapted to secure said base to the casing; an adjustable plate adapted to be fixed to said head; a "zero-mark" carried by said plate; and a pin carried by said plate opposite to said "zero-mark."

In testimony whereof, I have signed my name to this specification in the presence of two subscribing witnesses.

ISAIAH HALL.

Witnesses:
 HAROLD H. FORRESTER,
 ARNOLD S. ILLSTON.